June 12, 1923.

G. J. ZINK

SPIRAL ROPE AND CABLE GRIP

Filed July 11, 1921

1,458,261

INVENTOR.
GEORGE J. ZINK
BY
ATTORNEYS.

Patented June 12, 1923.

1,458,261

UNITED STATES PATENT OFFICE.

GEORGE J. ZINK, OF SAN FRANCISCO, CALIFORNIA.

SPIRAL ROPE AND CABLE GRIP.

Application filed July 11, 1921. Serial No. 483,941.

*To all whom it may concern:*

Be it known that I, GEORGE J. ZINK, a citizen of the United States, and resident of San Francisco, county of San Francisco, and State of California, have invented a new and useful Spiral Rope and Cable Grip, of which the following is a specification.

The present invention relates to improvements in means for securing a cable or a rope around an object to be acted on by the same, as, for instance, on the front axle of an automobile to be towed, or around a log of wood to be moved, or any other similar object. In particular it is an object of my invention to provide a means for temporarily securing a rope or cable which can be handled very easily, can be fastened and unfastened without any effort and still positively secures the cable or rope to the object to be acted on so firmly that it cannot lose its grip no matter how much towing power is applied.

Figure 1:
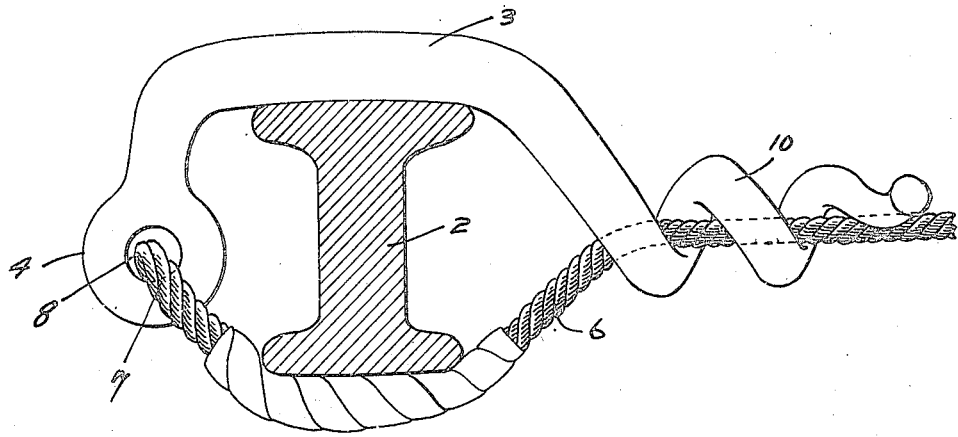
Figure 2:
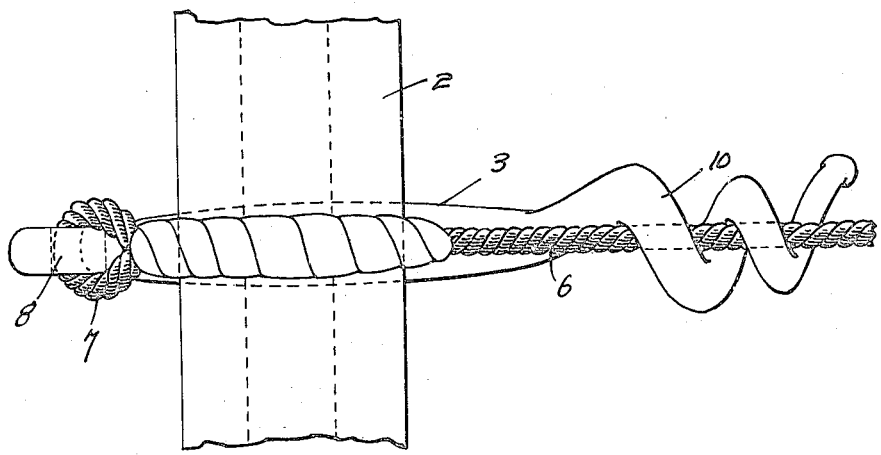

The preferred embodiment of my invention is illustrated in the accompanying drawing, in which Figure 1 is a view in side elevation of my device attached to the end of a cable and securing the same to the front axle of an automobile, and Figure 2 is a plan view of the same combination.

Referring to the drawings in detail, it will be seen that my device is shown as being secured on an I-beam (2), which may be assumed to be the front axle of an automobile to be towed. My device consists simply of a metal rod (3), one end (4) of which is secured to the end of the cable (6) in a permanent manner, as, for instance, by means of a loop (7) in the cable engaging an eye (8) in the rod, and the other end of which is bent into a spiral (10) of sufficient pitch to allow the cable to pass freely between two parallel members of the spiral and of an inner diameter sufficiently large to allow the cable to comfortably play within the same.

I wish to point out here in particular that the particular shape of the rod apart from the spiral has no bearing on the case. The form selected for the drawing seems to be appropriate for the front axle of an automobile and objects of similar cross-section, but would probably be inadequate where a heavy log is to be gripped, in which case a straight rod or a rod slightly curved to correspond to the curve of the log should be selected. It seems to be essential that the spiral emanate from the rod in such a manner that the same can be brought into the line of draft.

The length of the rod is of little importance. It may span about one-half of the object to be gripped, as in the drawing, or more, or considerably less, as might be desired when a comparatively heavy object is to be embraced or great latitude is desired in the adaptability of the grip.

The number of spirals necessary to secure a firm grip may vary with the material used for the rope or cable, a stiff cable not calling for as many turns as a soft rope. For ordinary use with a cable the spiral shown in the drawing will answer the purpose.

It will be seen at a glance that it is a very simple and easy procedure to secure the cable or rope to the object in question. All that needs to be done is to encircle the object with the cable and the rod, preferably in a position where the spiral is in the line of draft, and to wind the cable into the spirals, as shown in the drawing. For its removal the cable need only be wound out of the spiral and cable and rod can be easily taken away.

I claim:

Means for forming a loop around an object comprising a spiral, a shank extending from one end of the spiral substantially at the angle of the spiral windings, a flexible member and means for securing the same to the free end of the shank allowing an intermediate portion of the flexible member to be twisted into the spiral while the shank and the flexible member encircle the object.

GEORGE J. ZINK.